United States Patent
Gamaley et al.

(10) Patent No.: US 8,935,369 B2
(45) Date of Patent: Jan. 13, 2015

(54) INFORMATION TECHNOLOGY FOR EXCHANGING STRUCTURAL ORGANIZATIONAL INFORMATION

(75) Inventors: Vladimir Gamaley, Rehovot (IL); Gili Nachum, Bet-shemesh (IL); Gil Perzy, Holon (IL)

(73) Assignee: International Business Machines Corporation, Armonk, NY (US)

( * ) Notice: Subject to any disclaimer, the term of this patent is extended or adjusted under 35 U.S.C. 154(b) by 898 days.

(21) Appl. No.: 12/898,596

(22) Filed: Oct. 5, 2010

(65) Prior Publication Data

US 2012/0084417 A1    Apr. 5, 2012

(51) Int. Cl.
 G06F 15/177   (2006.01)
 H04L 29/12    (2006.01)
 H04L 29/08    (2006.01)

(52) U.S. Cl.
 CPC ......... H04L 61/2596 (2013.01); H04L 61/1523 (2013.01); H04L 61/307 (2013.01); H04L 67/24 (2013.01)
 USPC ........................................................ 709/222

(58) Field of Classification Search
 CPC ................... H04L 61/2596; H04L 61/307
 USPC ...................................................... 709/222
 See application file for complete search history.

(56) References Cited

U.S. PATENT DOCUMENTS

| | | | |
|---|---|---|---|
| 6,895,430 B1 * | 5/2005 | Schneider | 709/217 |
| 7,136,932 B1 * | 11/2006 | Schneider | 709/245 |
| 7,216,227 B2 * | 5/2007 | Grynberg | 713/162 |
| 7,228,301 B2 * | 6/2007 | Meyerzon et al. | 1/1 |
| 7,231,428 B2 * | 6/2007 | Teague | 709/206 |
| 7,317,701 B2 * | 1/2008 | Roy | 370/328 |
| 7,317,703 B2 * | 1/2008 | Roy | 370/328 |
| 7,346,022 B1 * | 3/2008 | Roy | 370/328 |
| 7,471,686 B2 * | 12/2008 | Roy | 370/395.21 |
| 7,508,835 B2 * | 3/2009 | Roy | 370/401 |
| 7,657,639 B2 * | 2/2010 | Hinton | 709/229 |
| 7,698,433 B2 * | 4/2010 | Gallant | 709/227 |
| 8,184,638 B2 * | 5/2012 | Roy | 370/395.21 |
| 8,230,027 B2 * | 7/2012 | Cardone et al. | 709/206 |
| 2002/0165969 A1 * | 11/2002 | Gallant | 709/227 |
| 2003/0023435 A1 * | 1/2003 | Josephson | 704/235 |
| 2003/0093480 A1 | 5/2003 | Lagarde | |
| 2003/0200334 A1 * | 10/2003 | Grynberg | 709/245 |
| 2003/0225850 A1 * | 12/2003 | Teague | 709/207 |
| 2003/0229717 A1 * | 12/2003 | Teague | 709/246 |
| 2004/0024879 A1 * | 2/2004 | Dingman et al. | 709/227 |
| 2004/0223488 A1 * | 11/2004 | Roy | 370/352 |
| 2004/0267721 A1 * | 12/2004 | Meyerzon et al. | 707/3 |

(Continued)

OTHER PUBLICATIONS ip.com: "System and Method of Auto Populating Email Messages to Recipients' LDAP Generated and Related Groups", IP.com No. IPCOM000184378D; Publisher: IP.com.

*Primary Examiner* — Jimmy H Tran
*Assistant Examiner* — Marcus McKenzie
(74) *Attorney, Agent, or Firm* — Anthony V. S. England; Ingrid Foerster

(57) ABSTRACT

Facilitating communications by receiving from a requestor a request regarding an alternate of a contact, where a computer network address of the contact is known to the requestor, and where the request identifies the alternate using an alias in which the computer network address of the contact is modified to include an alias template associated with the alternate, and forwarding the request to the alternate at a computer network address associated with the alias.

16 Claims, 5 Drawing Sheets

(56) References Cited

U.S. PATENT DOCUMENTS

| | | |
|---|---|---|
| 2005/0097222 A1* | 5/2005 | Jiang et al. .................... 709/245 |
| 2005/0204011 A1* | 9/2005 | Velayudham ................. 709/206 |
| 2005/0282526 A1* | 12/2005 | Leppanen et al. ......... 455/414.1 |
| 2006/0039324 A1* | 2/2006 | Roy ............................. 370/328 |
| 2006/0155814 A1* | 7/2006 | Bennett et al. ................ 709/207 |
| 2006/0230137 A1* | 10/2006 | Gare et al. ................... 709/224 |
| 2006/0285541 A1* | 12/2006 | Roy ............................. 370/389 |
| 2007/0028217 A1* | 2/2007 | Mishra et al. ................. 717/124 |
| 2007/0260693 A1* | 11/2007 | Cardone et al. ............... 709/206 |
| 2007/0263565 A1* | 11/2007 | Roy ............................. 370/328 |
| 2007/0266125 A1* | 11/2007 | Lu et al. ....................... 709/222 |
| 2008/0021997 A1* | 1/2008 | Hinton ......................... 709/225 |
| 2008/0133911 A1 | 6/2008 | Eisen |
| 2008/0235330 A1* | 9/2008 | Cardone et al. ............... 709/203 |
| 2009/0006159 A1* | 1/2009 | Mohr et al. ...................... 705/7 |
| 2009/0109928 A1* | 4/2009 | Roy ............................. 370/331 |
| 2009/0248819 A1 | 10/2009 | Hutchison |
| 2010/0094983 A1* | 4/2010 | Zampiello et al. ........... 709/222 |
| 2010/0138520 A1* | 6/2010 | Gallant ........................ 709/220 |
| 2010/0177699 A1* | 7/2010 | Klefter et al. ................. 370/328 |
| 2011/0047076 A1* | 2/2011 | Carlson et al. ................. 705/44 |
| 2011/0066710 A1* | 3/2011 | Paul ............................. 709/222 |
| 2012/0016938 A1* | 1/2012 | Gallant ........................ 709/204 |
| 2012/0042263 A1* | 2/2012 | Rapaport et al. ............. 715/753 |
| 2013/0212239 A1* | 8/2013 | Zampiello et al. ........... 709/222 |

* cited by examiner

INFORMATION TECHNOLOGY FOR EXCHANGING STRUCTURAL ORGANIZATIONAL INFORMATION

FIELD OF THE INVENTION

The invention relates to computer network-based communications in general.

BACKGROUND OF THE INVENTION

Nowadays computer users often communicate with other computer users via computer networks by using computer-based software applications with messaging capabilities, such as IBM™ Lotus Sametime™, commercially-available from International Business Machines Corporation, Armonk, N.Y. Typically, computer users employing such messaging applications maintain a contact list of other computer users with whom they may wish to communicate, and subscribe to receive notifications regarding the current status of each of their contacts, such as whether or not a contact is currently available to receive communications. However, there are occasions where a computer user may wish to communicate with a contact's associate, such as the contact's supervisor or assistant. When this occurs, and the computer user lacks the information necessary for communicating directly with the associate, the computer user typically must request the information from the contact, whereas the contact may be currently unavailable to provide the information.

SUMMARY OF THE INVENTION

In one aspect of the invention a method is provided for facilitating communications, the method including receiving from a requestor a request regarding an alternate of a contact, where a computer network address of the contact is known to the requestor, and where the request identifies the alternate using an alias in which the computer network address of the contact is modified to include an alias template associated with the alternate, and forwarding the request to the alternate at a computer network address associated with the alias.

In another aspect of the invention a method is provided for facilitating communications, the method including constructing an alias in which a computer network address of a contact is modified to include an alias template associated with an alternate of the contact, and sending a request to a communications server regarding the alternate, where the request identifies the alternate using the alias.

Systems and computer-program products are also provided embodying the invention.

BRIEF DESCRIPTION OF THE DRAWINGS

The invention will be understood and appreciated more fully from the following detailed description taken in conjunction with the appended drawings in which.

DETAILED DESCRIPTION OF THE INVENTION

Figure 1:
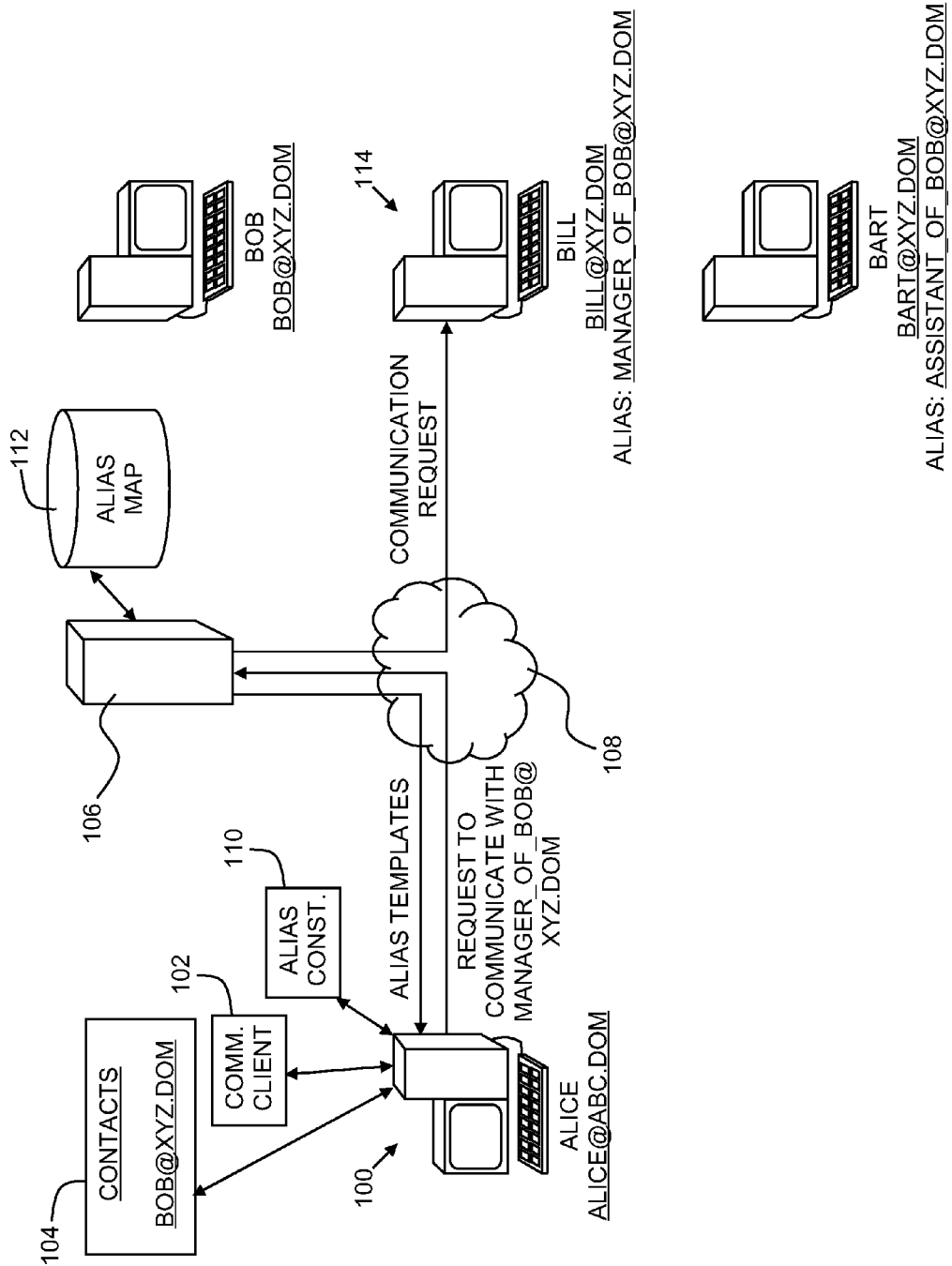
FIG. 1 is a simplified conceptual illustration of a system for facilitating computer network-based communications with alternate contacts, constructed and operative in accordance with an embodiment of the invention.

The invention is now described within the context of one or more embodiments, although the description is intended to be illustrative of the invention as a whole, and is not to be construed as limiting the invention to the embodiments shown. It is appreciated that various modifications may occur to those skilled in the art that, while not specifically shown herein, are nevertheless within the true spirit and scope of the invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Reference is now made to FIG. 1 which is a simplified conceptual illustration of a system for facilitating computer network-based communications with alternate contacts, constructed and operative in accordance with an embodiment of the invention. In the system of FIG. 1, a computer 100 is shown, where computer 100 is preferably configured to execute a communications client 102, such as computer-based software application with messaging capabilities, such as IBM™ Lotus Sametime™, commercially-available from International Business Machines Corporation, Armonk, N.Y. A computer user, such as a computer user named Alice having a computer network address of ALICE@ABC.DOM, preferably maintains a contact list 104 that is accessible to communications client 102, such as listing a computer user named Bob having a computer network address of BOB@XYZ.DOM. A communications server 106 preferably provides communications client 102 via a computer network 108 with one or more alias templates, such as in response to a subscription request made by Alice to receive notifications regarding the current status of Bob. For example, communications server 106 may send the following alias templates to communications client 102 in the form of Extensible Markup Language (XML) statements:

```
<support>
    <entity prefix="manager_of_" display-name="Manager"/>
    <entity prefix="assistant_of_" display-name="Assistant"/>
</support>
```

An alias template may be used to modify a known computer network address of a contact in order to form an alias representing an alternate contact, typically one that is associated with the contact in some way. Thus, in the statements above, the prefix "manager_of_" represents an alias template that may be added as a prefix to a known computer network address of a contact in order to communicate with the manager of the contact. Similarly, the prefix "assistant_of_" represents an alias template that may be added as a prefix to a known computer network address of a contact in order to communicate with the contact assistant. Computer 100 may be configured to execute an alias constructor 110 directly. Alternatively, alias constructor 110 may be incorporated within communications client 102. Alias constructor 110 is configured to construct aliases as described herein. Thus, in the current example, should Alice wish to communicate with Bob's manager or assistant, Alice may do so by using alias constructor 110 to construct an alias such as MANAGER_OF_BOB@XYZ.DOM or ASSISTANT_OF_BOB@XYZ.DOM and specifying to communication server 106 that she wishes to communicate with MANAGER_OF_BOB@XYZ.DOM or ASSISTANT_OF_BOB@XYZ.DOM, such as in a chat session. Communications client 102 may be configured with a user interface which displays the contacts in contact list 104 along with associated alternate contacts as indicated by the alias templates for selection by the user. Thus, in the current example, in addition to listing Bob as a contact, the user interface may list Bob's alternate contacts as "Bob's Manager" and "Bob's Assistant" for Alice's selection, whereupon alias constructor 110 creates the appropriate alias as described above.

Upon receiving a request in which communication with an alias is requested, communication server 106 preferably consults an alias map 112 in which aliases are mapped to actual computer network addresses, and forwards the communication request to the actual computer network address. Thus, in the current example, the alias MANAGER_OF_BOB@XYZ.DOM may be mapped to the computer network address BILL@XYZ.DOM of a computer user named Bill who is Bob's manager, and a request to communicate with MANAGER_OF_BOB@XYZ.DOM will be forwarded to BILL@XYZ.DOM, such as to a computer 114.

Aliases may also be sent to communication server 106 as part of a subscription request to receive presence information regarding an alternate contact. Thus, in the current example, Alice may subscribe to receive presence information regarding Bob's manager, such as whether or nor Bob's manager is currently online.

It will be appreciated that the use of alias templates as described herein does not require Alice to know Bill's actual computer network address, nor even to know that Bill is Bob's manager, while enabling Alice to communicate with Bill, such as when Bob is unavailable.

Figure 2:
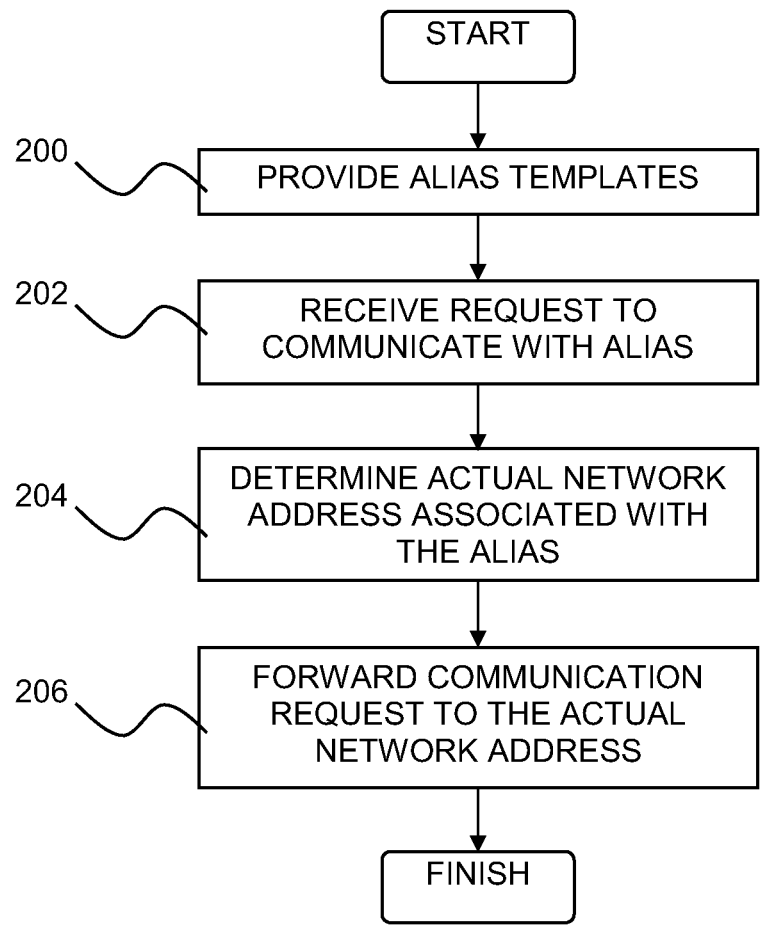
FIG. 2 is a simplified flowchart illustration of an exemplary method of operation of the system of FIG. 1, operative in accordance with an embodiment of the invention.

Reference is now made to FIG. 2 which is a simplified flowchart illustration of an exemplary method of operation of the system of FIG. 1, operative in accordance with an embodiment of the invention. In the method of FIG. 2, one or more alias templates are provided for use with computer network addresses of computer users (step 200). Different sets of alias templates may be defined with different granularities, such as for a given domain, group of domains, sub-domain, group of sub-domains, user, or group of users. A computer user who wishes to communicate with an alternate contact of a contact known to the computer user issues a communication request specifying an alias of the alternate contact, where the alias is formed by modifying the computer network address of a contact using the alias template of the desired alternate contact, such as by concatenating the desired alias template with the computer network address of the desired contact (step 202). The actual network address that is associated with the alias is determined (step 204). The communication request is forwarded to the actual network address of the alternate contact (step 206).

Figure 3:
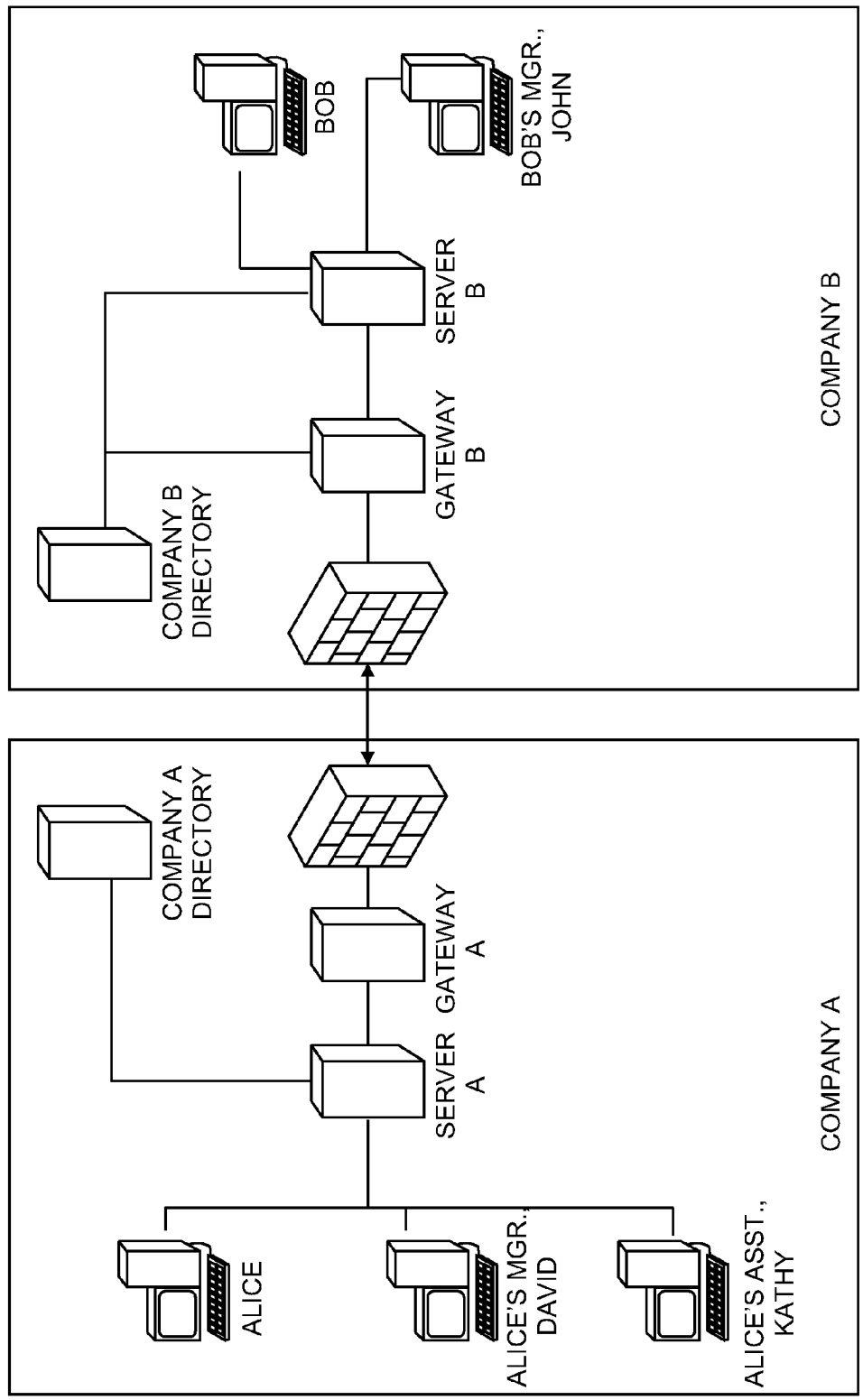
FIG. 3 is a simplified conceptual illustration of a system for facilitating computer network-based communications with alternate contacts, constructed and operative in accordance with an alternative embodiment of the invention.
Figure 4:
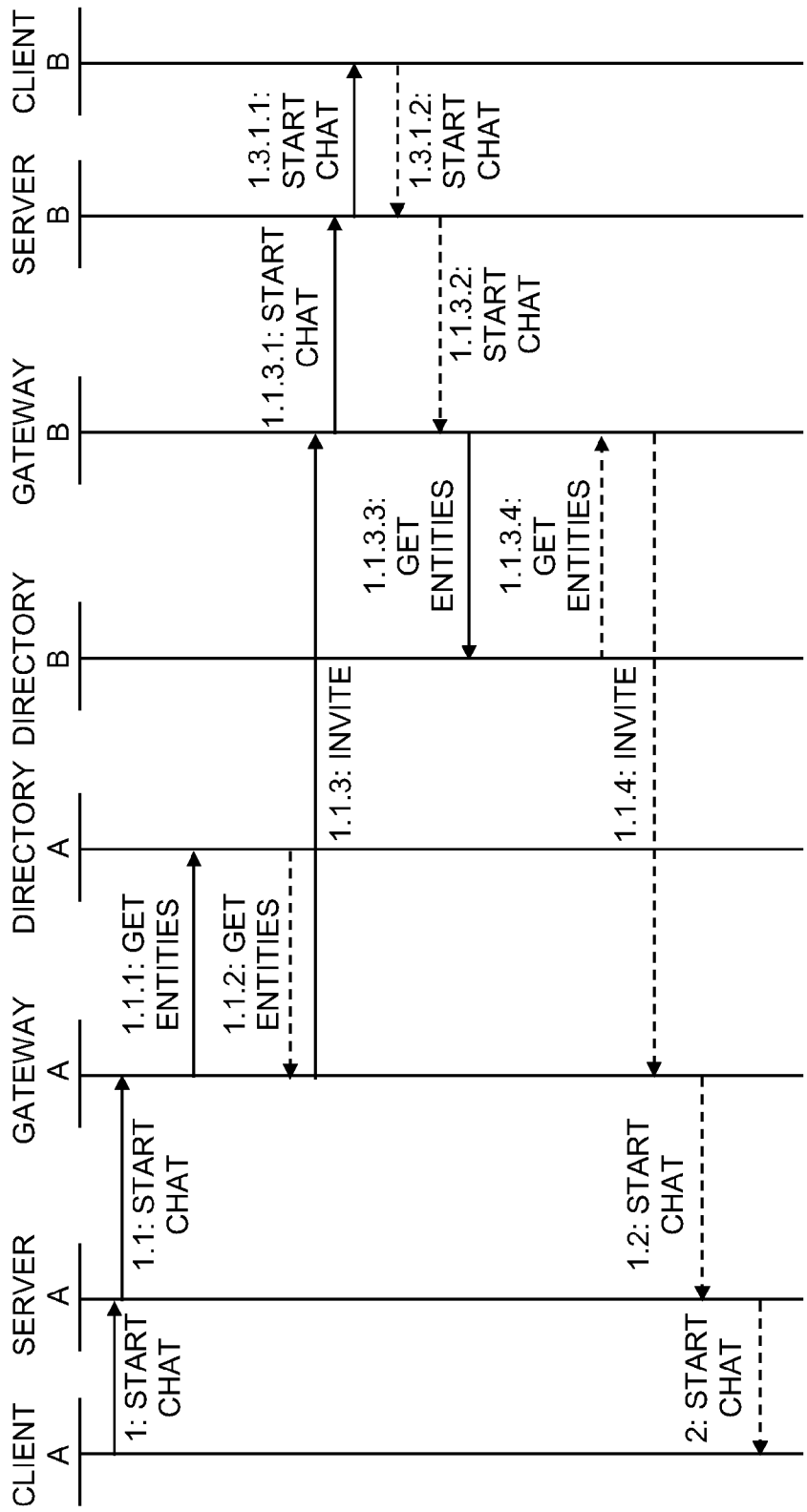
FIG. 4 is a simplified action diagram of an exemplary operational scenario of the system of FIG. 3, operative in accordance with an alternative embodiment of the invention.

Reference is now made to FIG. 3 which is a simplified conceptual illustration of a system for facilitating computer network-based communications with alternate contacts, constructed and operative in accordance with an alternative embodiment of the invention, and additionally to FIG. 4, which is a simplified action diagram of an exemplary operational scenario of the system of FIG. 3, operative in accordance with an alternative embodiment of the invention. In the system of FIG. 3, two companies, Company A and Company B, and their respective computer networks are shown. Company A maintains a directory, labeled Company A Directory, such as a Lightweight Directory Access Protocol (LDAP) directory, of the network addresses of its computer users. Company A Directory preferably includes information indicating which computer users may act as alternate contacts for other computer users. Thus, for example, in Company A, David's role as a manager-type alternate contact of Alice is maintained in Company A Directory, as is Kathy's role as an assistant-type alternate contact of Alice. Company A also includes a server, labeled Server A, such as computer configured with IBM™ Lotus Sametime™ server software serving IBM™ Lotus Sametime™ clients, as well as a gateway, labeled Gateway A, such as computer configured with IBM™ Lotus Sametime™ gateway software. Company A also includes a firewall, labeled Firewall A, protecting its network. Company B likewise maintains a Company B Directory including the same information regarding its computer users as described above regarding Company A Directory, and is also shown having a Server B and a Gateway B, which may be configured with IBM™ Lotus Sametime™ software, as well as a Firewall B.

Where Company A and Company B are not able to directly access each other's directories, computer users in Company A may communicate with computer users in Company B without knowing their network addresses in advance, such as in the manner shown in FIG. 4. In FIG. 4, a computer user in Company A using a messaging Client A requests to initiate a chat session with a computer user in Company B using a messaging Client B. The request is sent (msg 1) to Server A, and then to Gateway A (msg 1.1). Gateway A retrieves Client A's details from the Company A Directory (msg 1.1.1). Gateway A composes XML statements using Client A's details and sends it to Gateway B (msg 1.1.3), such as part of a chat invitation or presence information subscription request. Gateway B forwards the chat request to Server B (msg 1.1.3.1), which in turn forwards the chat request to Client B (msg 1.1.3.1.1). Before Gateway B sends back a response from Client B (msg 1.1.4), it retrieves Client B's details from Company B Directory (msg 1.1.3.3), composes XML statements using Client B's details, and sends them to Gateway A in response to the invitation (msg 1.1.4). The response is then forwarded to Server A (msg 1.2) and then to Client A (msg 2).

As described above, the XML statements preferably include alias templates as follows, which may be set as part of an additional header in a Session Initiation Protocol (SIP) request:

```
<support>
    <entity prefix="manager_of_" display-name="Manager"/>
    <entity prefix="assistant_of_" display-name="Assistant"/>
</support>
```

If a gateway receives alias templates that it or its client doesn't support, no similar XML will be sent in the response, or, alternatively, an empty XML may be sent with only <support/>. Messaging clients preferably list the alias templates that may be selected when deciding whether to communicate with a known contact, or with an alternate contact of the known contact using an alias template.

The gateways may exchange generally-supported alias templates that are not specific to a particular contact, and/or contact-specific or group-specific alias templates. Thus, generally-supported alias templates might indicate:

```
<support>
    <entity prefix="manager_of_" display-name="Manager"/>
    <entity prefix="assistant_of_" display-name="Assistant"/>
</support>
``` whereas alias templates applicable for Alice might be:

```
<support>
    <entity prefix="assistant_of_" display-name="Assistant"/>
</support>
``` while alias templates applicable for Bob might be:

```
<support>
    <entity prefix="manager_of_" display-name="Manager"/>
</support>
```

Thus, where Alice and Bob are known to each other as contacts, Alice's user interface may list Bob as a contact and "Bob's Manager" as an alternate contact, while Bob's user interface may list Alice as a contact and "Alice's Assistant" as an alternate contact. Contact-specific or group-specific alias templates may be associated with specific contacts or groups of contacts using any know method for defining contact-specific or group-specific information.

The gateways may exchange alias templates in one or both directions when they first become aware of each other, and periodically thereafter, and/or when one gateway receives a communication or subscription request from the other.

Alias templates may include a depth value indicating hierarchical levels of alternate contacts. Thus, for example:

```
<support>
    <entity prefix="manager_of_" display-name="Manager"
        depth="2" />
    <entity prefix="assistant_of_" display-name="Assistant"
```

```
        depth="1" />
</support>
``` indicates that not only is the manager of a contact an alternate contact, but that the manager of the manager of a contact is an alternate contact as well.

Figure 5:
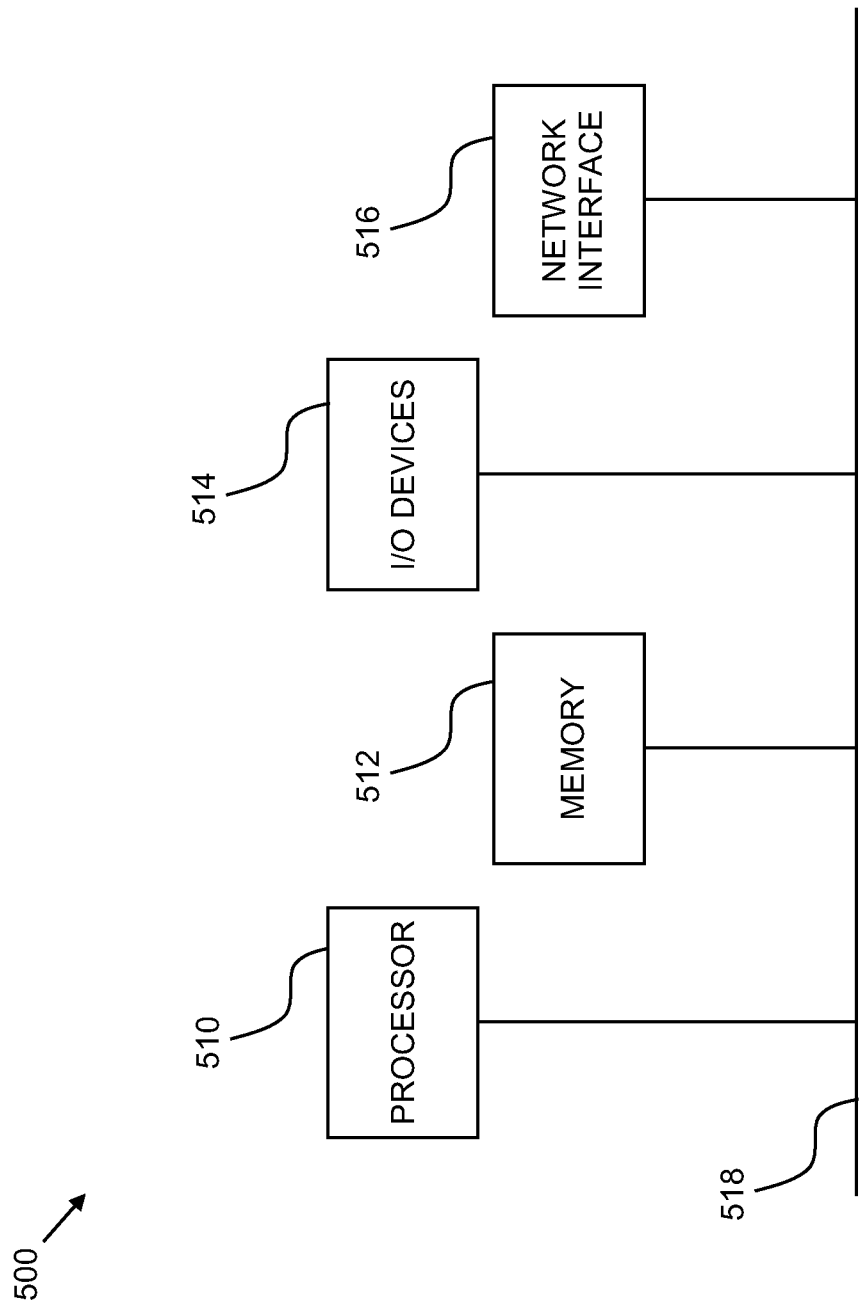
FIG. 5 is a simplified block diagram illustration of an exemplary hardware implementation of a computing system, constructed and operative in accordance with an embodiment of the invention.

Referring now to FIG. 5, block diagram 500 illustrates an exemplary hardware implementation of a computing system in accordance with which one or more components/methodologies of the invention (e.g., components/methodologies described in the context of FIGS. 1-4) may be implemented, according to an embodiment of the invention.

As shown, the techniques for controlling access to at least one resource may be implemented in accordance with a processor 510, a memory 512, I/O devices 514, and a network interface 516, coupled via a computer bus 518 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The flowchart and block diagrams in the Figures illustrate the architecture, functionality, and operation of possible implementations of systems, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that any of the elements described hereinabove may be implemented as a computer program product embodied in a computer-readable medium, such as in the form of computer program instructions stored on magnetic or optical storage media or embedded within computer hardware, and may be executed by or otherwise accessible to a computer (not shown).

While the methods and apparatus herein may or may not have been described with reference to specific computer hardware or software, it is appreciated that the methods and apparatus described herein may be readily implemented in computer hardware or software using conventional techniques.

While the invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A method for facilitating communications with a user who is an alternate of a user who is a contact, the method comprising:
    receiving, by a computer processor from a requestor, a request regarding the alternate of the contact,
        wherein a computer network address of said contact is known to said requestor, and
        wherein said request identifies said alternate using an alias, wherein said alias includes said computer network address of said contact and an alias template associated with said alternate; and
    forwarding, by at least one computer processor, said request to said alternate at a computer network address associated with said alias,
        wherein the method further comprises:
    sending said alias template to said requestor in advance of receiving said request from said requestor and wherein said alias template is sent together with an identifier indicating that said alias template is associated with said contact.

2. The method according to claim 1, comprising:
    sending a request to communicate with said alternate responsive to receiving the request from the requestor.

3. The method according to claim 1 comprising:
    sending a request for presence information regarding said alternate responsive to receiving the request from the requestor.

4. The method according to claim 1 wherein said sending step comprises sending wherein said alias template is sent together with a depth value indicating a number of hierarchical levels associated with said alternate.

5. The method according to claim 1 wherein said receiving and forwarding steps are implemented by computer software embodied in a computer-readable storage medium.

6. A system for facilitating communications with a user who is an alternate of a user who is a contact, the system comprising:
    at least one computer processor; and
    a storage device connected to the at least one computer processor, wherein the storage device has stored thereon a communications program for controlling the at least one computer processor, and wherein the at least one computer processor is configured with the program to execute the program to:
        receive from a requestor a request regarding the alternate of the contact,
            wherein a computer network address of said contact is known to said requestor, and
            wherein said request identifies said alternate using an alias, wherein said alias includes said computer network address of said contact and an alias template associated with said alternate, and forward said request to said alternate at a computer network address associated with said alias; and an alias map stored on a storage device connected to the at least one computer processor, in which said computer network address associated with said alias is stored, wherein said at least one computer processor is configured to use said alias map to determine that said computer network address is associated with said alias, wherein the at least one computer processor is configured with the program to execute the program to:

send said alias template to said requestor in advance of receiving said request from said requestor, wherein said alias template is sent together with an identifier indicating that said alias template is associated with said contact.

7. The system according to claim 6 wherein said request is a request to communicate with said alternate and said at least one computer processor is configured with the program to execute the program to send a request to communicate with said alternate responsive to receiving the request from the requestor.

8. The system according to claim 6 wherein said request is a request for presence information regarding said alternate and said at least one computer processor is configured with the program to execute the program to send a request for the presence information responsive to receiving the request from the requestor.

9. The system according to claim 6 wherein said alias template is sent together with a depth value indicating a number of hierarchical levels associated with said alternate.

10. A method for facilitating communications with a user who is an alternate of a user who is a contact, the method comprising:

constructing, by at least one computer processor, an alias wherein said alias includes a computer network address of said contact and an alias template associated with an alternate of said contact; and sending, by the least one computer processor, a request to at least one other computer processor regarding said alternate, wherein said request identifies said alternate using said alias, wherein the method further comprises:

receiving said alias template in advance of sending said request, wherein said alias template is received together with an identifier indicating that said alias template is associated with said contact.

11. The method according to claim 10 wherein sending said request includes sending a request to communicate with said alternate.

12. The method according to claim 10 wherein sending said request includes sending a request for presence information regarding said alternate.

13. A system for facilitating communications with a user who is an alternate of a user who is a contact, the system comprising:

at least one computer processor; and a storage device connected to the at least one computer processor, wherein the storage device has stored thereon a communications program for controlling the at least one computer processor, and wherein the at least one computer processor is configured with the program to execute the program to:

construct an alias wherein said alias includes a computer network address of said contact and an alias template associated with said alternate of said contact; and send a request to at least one computer processor regarding said alternate, wherein said request identifies said alternate using said alias, wherein the at least one computer processor is configured with the program to execute the program to:

receive said alias template in advance of sending said request, wherein said alias template is received together with an identifier indicating that said alias template is associated with said contact.

14. The system according to claim 13 wherein for the request, said at least one computer processor is configured with the program to execute the program to send a request to communicate with said alternate.

15. The system according to claim 13 wherein for the request, said at least one computer processor is configured with the program to execute the program to send a request for presence information regarding said alternate.

16. A computer program product for facilitating communications with a user who is an alternate of a user who is a contact, the computer program product comprising:

a non-transitory computer-readable storage medium; and computer-readable program code embodied in said non-transitory computer-readable storage medium, wherein said computer-readable program code is configured to:

receive from a requestor, a request regarding the alternate of the contact, wherein a computer network address of said contact is known to said requestor, and wherein said request identifies said alternate using an alias wherein said alias includes said computer network address of said contact and an alias template associated with said alternate, and forward said request to said alternate at a computer network address associated with said alias, wherein said computer-readable program code is configured to:

send said alias template to said requestor in advance of receiving said request from said requestor, wherein said alias template is sent together with an identifier indicating that said alias template is associated with said contact.

\* \* \* \* \*